June 9, 1964          J. RODWAY          3,136,392
CONTROL SYSTEM FOR HYDROKINETIC TYPE BRAKE DEVICE
Filed Oct. 3, 1961          3 Sheets-Sheet 1
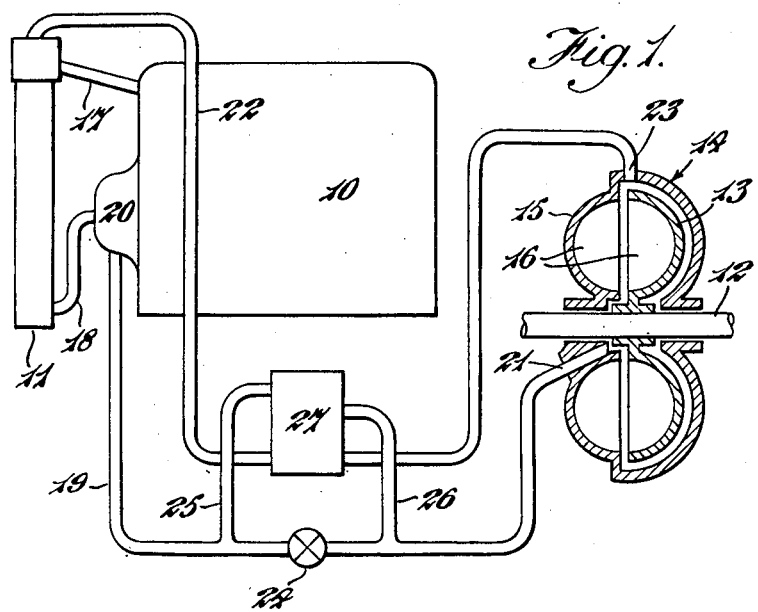
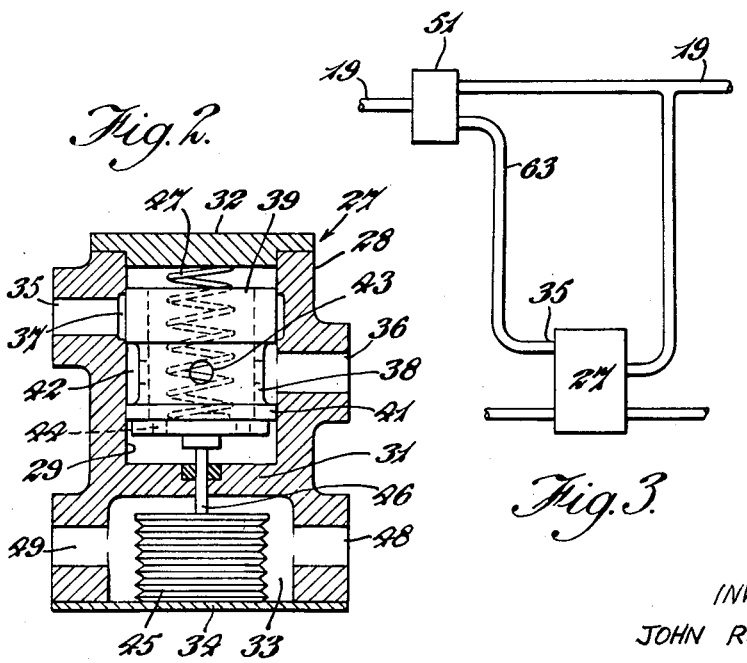
INVENTOR
JOHN RODWAY
By Lawrence J. Winter
ATTORNEY

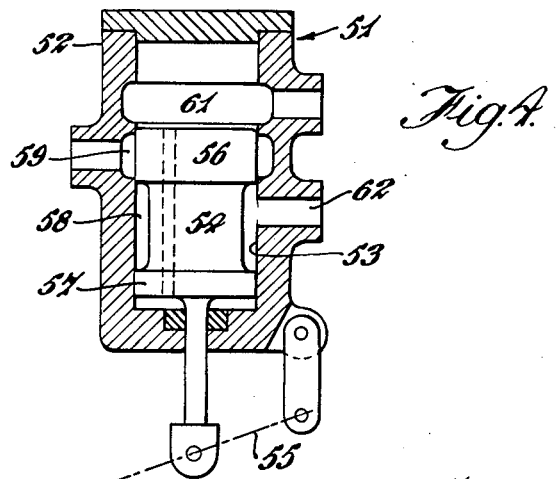
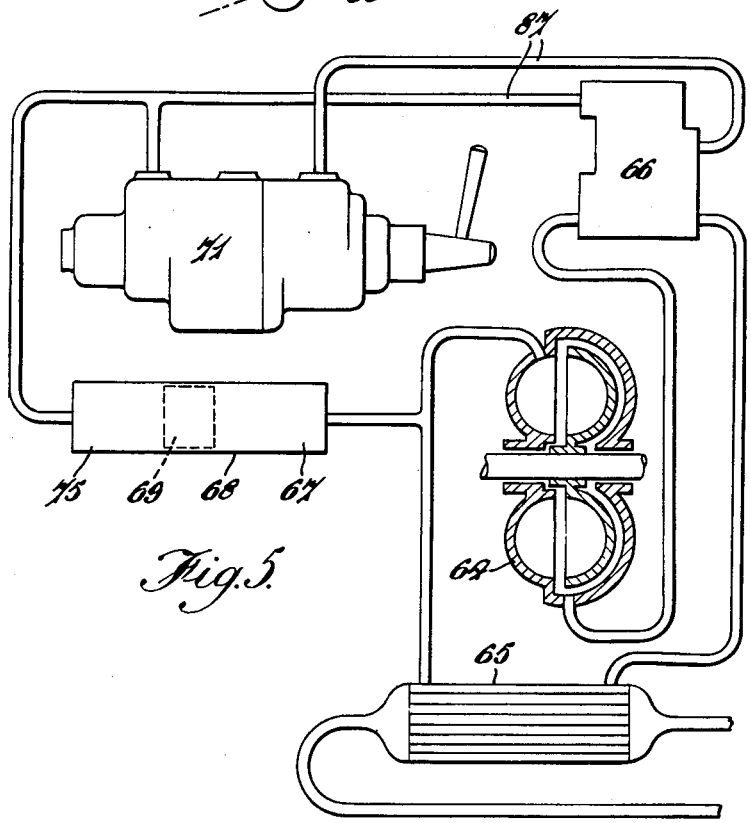

June 9, 1964  J. RODWAY  3,136,392
CONTROL SYSTEM FOR HYDROKINETIC TYPE BRAKE DEVICE
Filed Oct. 3, 1961  3 Sheets-Sheet 3

INVENTOR
JOHN RODWAY
By Lawrence J. Winter
ATTORNEY

United States Patent Office 3,136,392
Patented June 9, 1964

3,136,392
CONTROL SYSTEM FOR HYDROKINETIC TYPE
BRAKE DEVICE
John Rodway, Leamington Spa, England, assignor to
Automotive Products Company Limited, Leamington
Spa, England
Filed Oct. 3, 1961, Ser. No. 142,655
3 Claims. (Cl. 188—90)

This invention relates to braking systems for vehicles including braking devices of the hydro-kinetic type, in which a braking torque is generated by the circulation of liquid in a torus chamber between a fixed stator and a rotor carried by a shaft to which braking is to be applied, the stator and rotor being formed with vanes in the torus chamber.

It has been proposed to cause the liquid which circulates in the torus chamber to pass through the vehicle radiator, or through a heat exchanger in which the heat is transferred to another liquid circulating through the vehicle radiator, in order that the heat generated in the liquid by the work done in the braking device may be dissipated. It will be apparent that, since the heat dissipating capacity of a vehicle radiator is limited, an excessive generation of heat in the braking device could cause boiling of the cooling liquid, which is in any case undesirable and would destroy the effectiveness of the braking device if the cooling liquid were circulating therein.

It is known that the braking torque produced by a braking device of the hydro-kinetic type varies with the degree of filling of the said device with liquid, and the object of the present invention is to provide means for controlling the braking torque produced by the braking device so as to ensure that the cooling liquid is kept below the boiling point.

According to the present invention, in a braking system for vehicles comprising a braking device of the hydro-kinetic type and a heat exchanger arranged in a liquid circuit so that heat absorbed by the liquid in the braking device is dissipated in the heat exchanger, automatically operating means are provided to vary the quantity of liquid in the said braking device in response to changes in the temperature of the said liquid so as to limit the said temperature to a predetermined maximum.

The automatically operating means may comprise a valve controlling the admission of liquid to the braking device and thermostatically operated means to control the said valve.

The braking device and the heat exchanger may be incorporated in a closed liquid circuit to which is connected a variable volume chamber, the automatically operating means controlling air pressure acting on the liquid in said variable volume chamber.

The invention is hereinafter described with reference to the accompanying drawings, in which:

FIGURE 1 is a diagram showing one form of braking system according to the invention;

FIGURE 2 is a sectional elevation of the control valve shown in FIGURE 1 and its thermostatically operated control means;

FIGURE 3 is a diagram similar to part of FIGURE 1 and showing a modified arrangement;

FIGURE 4 is a sectional elevation of the manually operated valve shown in FIGURE 3;

FIGURE 5 is a diagram showing another form of braking system according to the invention;

Figure 6:
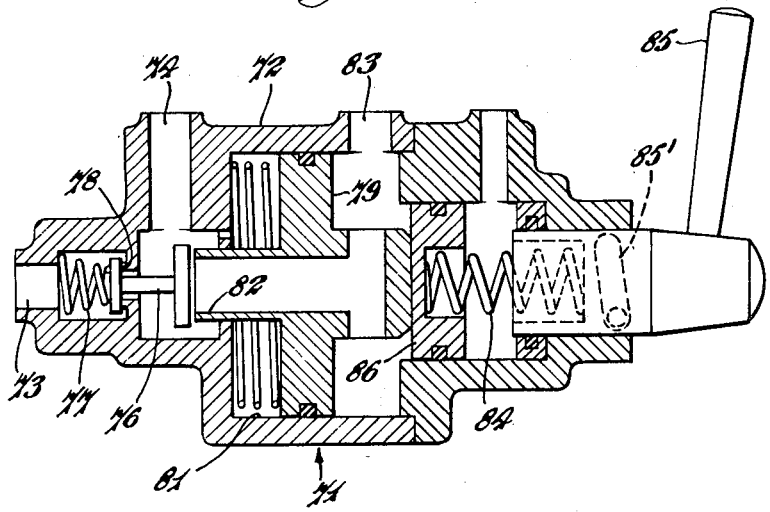
FIGURE 6 is a sectional elevation of the control valve shown in FIGURE 5.

In the braking system shown in FIGURE 1, an internal combustion engine providing motive power for a vehicle is shown at 10, and a radiator through which cooling liquid employed to cool the engine is circulated is shown at 11. Motive power is transmitted to road wheels of the vehicle through a transmission shaft 12 on which is fixed the rotor 13 of a hydro-kinetic braking device 14, the stator 15 of which is held against rotation. The rotor 13 and stator 15 of the hydro-kinetic braking device together form a torus chamber, each of them being provided, in the said chamber, with vanes 16.

The top and bottom connections between the radiator 11 and the cooling jacket of the engine are shown at 17 and 18 respectively, a pump 20, driven by the engine, being arranged in the connection 18. A conduit 19 connected to the output side of the pump 20 leads to an inlet connection 21 of the braking device 14, and a conduit 22 branching from the upper connection 17 leads to an outlet connection 23 of the braking device 14. A manually operable shut-off valve 24 is mounted in the conduit 19, branch conduits 25 and 26 connected to the conduit 19 on opposite sides of the valve 24 being connected to opposite sides of a thermostatically operated control valve 27, shown in section in FIGURE 2 and including a thermostat chamber interposed in the conduit 22.

The manually-controlled shut-off valve 24 may be of any desired type, and may be set by the driver of the vehicle to allow any desired rate of flow of liquid into the braking device 14 so that the degree of filling thereof, and the braking torque generated, can be determined by the driver, subject to the overriding control of the control valve 27 if the setting selected by the driver is such that the liquid is excessively heated.

The control valve 27, as shown in FIGURE 2, comprises a body 28 in which is formed a bore 29, closed at its inner end by a wall 31 and at its outer end by a closure plate 32, and a thermostat chamber 33 on the opposite side of the wall 31, closed by a closure plate 34. The branch conduits 25 and 26 lead to ports 35 and 36 in the wall of the bore 29, the port 35 opening into a groove 37 in the said wall, and a hollow cup-like valve plunger 38 is slidable in the bore. The valve plunger 38 is formed with two lands 39 and 41 separated by a groove 42, the land 39 being wide enough to cover the groove 37, and the port 36 opening into the groove 42. The valve plunger 38 is formed with radial apertures 43 connecting the interior thereof with the groove 42, and with apertures 44 in its end wall so that the two ends of the bore 29 are permanently connected together.

A thermostat bellows 45 in the thermostat chamber 33 is secured to the closure plate 34, and a rod 46, passing through the wall 31, transmits movement of the free end of the bellows to the valve plunger 38, which is urged towards the wall 31 by a spring 47. The portions of the conduit 22 on opposite sides of the thermostat chamber are connected to it at 48 and 49 respectively.

The spring 47 is so calibrated that so long as the temperature of the liquid in the conduit 22 remains below a predetermined value below its boiling point, the land 39 covers the groove 37 and the control valve is closed, so that the torque developed by the braking device is determined by the setting of the valve 24. If the temperature rises above the predetermined value, however the expansion of the thermostat bellows 45 moves the valve plunger to open the groove 42 to the groove 37 and increase the flow of liquid to the braking device, so that it is able to develop more braking torque, thus reducing the speed of the vehicle and the power to be dissipated as heat, so that the temperature of the liquid falls.

With the arrangement of the braking system shown in FIGURES 1 and 2, because the control valve 27, if it has been opened, will remain open after the manual shut-off valve 24 has been closed until the temperature of the liquid falls below the predetermined, some degree of braking will continue to be applied until the liquid temperature falls. To avoid this, and enable the braking device to be put out of action as soon as the manual shut-off valve is closed, the said shut off valve and the control valve 27 may be arranged as shown in FIGURE 3. In that arrangement, the shut-off valve 51 may be of the form shown in FIGURE 4, the branch conduit 25 being omitted and the inlet port 35 of the control valve 27 being connected to a second outlet from the shut-off valve 51 which is fully open whenever the main outlet from that valve is open to any degree.

The shut-off valve 51 shown in FIGURE 4 comprises a valve body 52 having a bore 53 in which is slidable a valve plunger 54 operable by a hand lever 55, the plunger 54 being formed with lands 56 and 57 separated by a circumferential groove 58. The part of the conduit 19 leading from the bottom radiator connection 18 is connected to a circumferential groove 59 in the bore 53, and the other part of the conduit 19 is connected to another circumferential groove 61 in the said bore. A port 62 in the bore 53 on the opposite side of the groove 59 to the groove 61 is connected by a conduit 63 to the inlet of the control valve 27. When the shut-off valve 51 is in its closed position, the land 56 covers the groove 59, but, to open the said valve, the plunger 54 is moved so that the said land 56 passes across the groove 61 until the said grooves 59 and 61 are connected by the groove 58. Thus, before the groove 61 is connected to the groove 59, the port 62 is fully opened to the groove 59 and flow can take place through the thermostatically operated control valve 27 if the temperature rises above the predetermined value. When the shut-off valve 51 is closed, however, no flow can take place through the control valve 27.

It will be understood that the shut-off valve shown in FIGURE 4 may be replaced by any other form of valve, such as a rotary valve, providing a similar control function.

The braking system shown in FIGURE 5 differs from that shown in the preceding figures in that the liquid circulating in the braking device is separate from that circulating in the engine cooling system of the vehicle, and the filling of the braking device is controlled by varying the pressure acting on the liquid circulating in the braking device.

Figure 7:
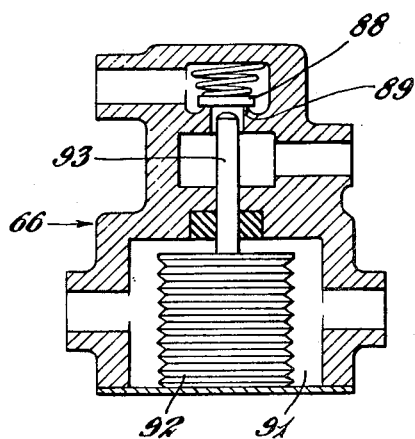
FIGURE 7 is a sectional elevation of the thermostatic device shown in FIGURE 5.

The braking device 64 which is similar to that shown in FIGURE 1, is arranged in a liquid flow circuit with a heat exchanger 65 connected in the engine cooling system of the vehicle and with the thermostat chamber of a thermostatically controlled valve 66 shown in detail in FIGURE 7. Connected to the liquid circuit of the braking device 64 is a variable-volume chamber 67 constituted by a cylinder 68 in which is mounted a piston 69 capable of being subjected to air pressure under the control of a valve device 71 shown in detail in FIGURE 6.

The valve device 71 comprises a body 72 connected at 73 to a compressed air supply and at 74 to the air chamber 75 in the cylinder 68, one head of a double-headed valve member 76 being urged by a spring 77 on to a seat 78 to shut off the air chamber 75 from the air supply. A piston 79 slidable in a cylinder 81 in the valve body 72 has formed on it a tubular stem 82 the bore of which provides a communication between the connection 74 and an exhaust port 83, the other head of the valve member 76 closing the bore in the stem 82 when the connection between the air supply and the air chamber 75 is open. Pressure acting in the air chamber 75 acts also on the piston 79 in a direction to cause closing of the connection between the air supply and the air chamber 75, and a load is applied to the piston 79 to open the said connection by a spring 84 the loading of which can be manually varied by rotating a handle 85 having a helical cam device 85' between itself and the valve body 72. The spring 84 acts on the piston 79 through a smaller piston 86. Thus the air pressure acting in the air chamber 75, and the filling of the braking device 64, can be varied by rotating the handle 85, thereby modifying the spring load on the piston 79 to vary the pressure which must be built up in the air chamber 75 to cause the connection to the air pressure supply to be cut off.

The valve 66, as shown in FIGURE 5, is connected in a conduit 87 extending from the connection 74 of the valve device 71 to an inlet to a chamber in that valve device containing the smaller piston 86, and, as shown in FIGURE 7, comprises a closure member 88 co-operating with a seat 89 to prevent flow of air through the conduit 87. The thermostat chamber 91 of the valve 66 contains a thermostat bellows 92 acting through a rod 93 to unseat the valve closure member 88 when the temperature of the liquid in the circuit of the braking device exceeds a predetermined value, thereby causing the pressure in the air chamber 75 to act on the piston 86 so as to partially balance the pressure acting on the piston 79 and cause the air pressure in the said chamber 75 to increase. Thus the filling of the braking device 64 is also increased, and the speed of the vehicle reduced, so that the amount of heat to be dissipated is also reduced.

The system described with reference to FIGURES 1 to 4 may be modified to separate the liquid in the circuit of the braking device from the cooling liquid in the vehicle engine, heat from the braking liquid being transferred to the cooling liquid through a heat exchanger and a separate pump being provided to circulate liquid through the braking device.

Whilst it is preferred to arrange that the thermostat is acted upon by liquid flowing from the braking device to the radiator or heat exchanger, the thermostat may be arranged so as to be responsive to the temperaure of liquid flowing into the braking device, the thermostat then being set to operate at a lower temperature.

I claim:

1. A braking system for vehicles comprising a braking device of the hydrokinetic type including a stator and rotor forming a torus chamber, and operating means for varying the quantity of liquid in said braking device in response to changes in temperature of the liquid, including a first liquid inlet conduit in communication with said chamber, a liquid outlet conduit in communication with said chamber, a manual valve disposed in said first inlet conduit for controlling the flow of liquid through said first inlet conduit, by-pass conduit means communicating with said first conduit to permit liquid flowing to said chamber to by-pass said manual valve and flow in parallel with respect to said manual valve, whereby said manual valve control is overridden, a thermostatic control valve disposed in said by-pass conduit means for controlling the flow of liquid therethrough, and temperature responsive means disposed in said outlet conduit operatively connected to said thermostatic control valve to open said thermostatic valve when the liquid temperature increases above a predetermined value below the boiling point of the liquid.

2. A braking system for vehicles comprising a braking device of the hydrokinetic type including a stator and rotor forming a torus chamber, and operating means for varying the quantity of liquid in said braking device in response to changes in temperature of the liquid, including a first liquid inlet conduit in communication with said chamber, a manual valve in said inlet conduit having an inlet and outlet connected to said inlet conduit, a by-pass conduit, said manual valve having another outlet connected to the end of said by-pass conduit, said by-pass conduit having another end connected to said inlet conduit downstream of said manual valve outlet to provide liquid flow in parallel with respect to said manual valve, a thermostatic control valve disposed in said by-pass conduit, whereby said manual valve control is overridden, temperature responsive means disposed in said outlet conduit operatively connected to said thermostatic control valve to open said thermostatic control valve when the liquid temperature increases above a predetermined value below the boiling temperature of the liquid.

3. The system of claim 2 wherein said manual valve includes a body with a slidable plunger therein and a hand lever operatively connected to said plunger, said manual valve inlet and outlet and another outlet being disposed in said body so movement of said plunger to shut off communication between said inlet and outlet shuts off communication between said inlet and said another inlet.

References Cited in the file of this patent

UNITED STATES PATENTS

| | | |
|---|---|---|
| 2,423,812 | Karl et al. | July 8, 1947 |
| 2,428,005 | Bennett | Sept. 30, 1947 |
| 2,496,497 | Russell | Feb. 7, 1950 |
| 2,541,227 | Findley | Feb. 17, 1951 |
| 2,594,460 | Lauck | Apr. 29, 1952 |
| 2,597,450 | Cline | May 20, 1952 |
| 2,667,238 | Bennett | Jan. 26, 1954 |
| 2,714,804 | O'Leary | Aug. 9, 1955 |
| 2,832,429 | Kelley et al. | Apr. 29, 1958 |
| 2,899,026 | Hitch et al. | Aug. 11, 1959 |
| 2,917,137 | Kelley | Dec. 15, 1959 |